United States Patent [19]

Spokoyny

[11] Patent Number: 5,524,557
[45] Date of Patent: Jun. 11, 1996

[54] CATALYTIC SULFUR TRIOXIDE FLUE GAS CONDITIONING

[75] Inventor: Felix E. Spokoyny, Costa Mesa, Calif.

[73] Assignee: Wahlco, Inc., Santa Ana, Calif.

[21] Appl. No.: 349,566

[22] Filed: Dec. 5, 1994

[51] Int. Cl.[6] .................................................... F23J 15/00
[52] U.S. Cl. ........................... 110/203; 110/210; 110/211; 110/216; 110/345
[58] Field of Search .................................. 110/203, 210, 110/211, 216, 345

[56] References Cited

U.S. PATENT DOCUMENTS

| | | | |
|---|---|---|---|
| 4,213,403 | 7/1980 | Gomori | 110/216 |
| 4,599,952 | 7/1986 | Meier | 110/216 |
| 4,898,105 | 2/1990 | Rappolst et al. | 110/216 |
| 4,961,908 | 10/1990 | Pennington et al. | 110/203 |
| 4,986,196 | 1/1991 | Butch | 110/210 |
| 5,237,939 | 8/1993 | Spokoyny et al. | 110/345 |
| 5,320,052 | 6/1994 | Spokoyny et al. | 110/216 |

*Primary Examiner*—John T. Kwon
*Attorney, Agent, or Firm*—Howard E. Sandler

[57] ABSTRACT

A method and apparatus for the selective control of the sulfur trioxide concentration in flue gases, to enhance the ash removal efficiency of electrostatic precipitators, which includes supporting a catalyst in the path of the flue gas, catalytically converting a portion of the sulfur dioxide contained within such flue gas to sulfur trioxide, by passing at portion of such flue gases over a catalyst which is positioned within the path; selectively varying the amount of sulfur trioxide produced by the catalytically converting, by selectively changing the quantity of flue gas flowing through such catalyst; and simultaneously maintaining the ratio of the pressure loss coefficient of the flue gas flowing through the other portion of such duct, in the vicinity of such catalyst, within a predetermined range.

33 Claims, 2 Drawing Sheets

CATALYTIC SULFUR TRIOXIDE FLUE GAS CONDITIONING

BACKGROUND OF THE INVENTION

This invention relates to power plant operations, and, more particularly, to an approach for removing particulate matter from a flue gas stream produced in a fossil fuel power plant, especially a coal-fired power plant.

In a fossil fuel power plant, a fuel is burned in air to produce a flue gas. The flue gas heats water in a boiler to generate steam, which turns a turbine to produce power. After passing through various apparatus, the flue gas is exhausted through a stack to the atmosphere.

The flue gas of certain fossil fuels (i.e. coal) includes solid particulate matter and a variety of gaseous contaminants. The maximum permissible emission levels of the particulate matter and gaseous contaminants are set by laws and regulations. The maximum emission levels are typically far less than the amounts present in the flue gas as it is produced, and various types of gas treatment apparatus are usually provided to reduce the particulate matter and gaseous contaminants in the flue gas before it leaves the stack.

In many power plants, particulate matter in the gas stream is removed by electrostatic precipitation. An electrostatic charge is applied to the particulate matter in the flue gas, and the flue gas passes between charged electrodes. The particulate matter is deposited upon the electrode having the opposite charge to that of the particulate and is later removed.

In plants burning coal, the fuel typically contains from about 0.2 percent to about 6 percent sulfur, which at least in part oxidizes to sulfur dioxide during combustion. A small part of the sulfur dioxide further oxidizes to sulfur trioxide. Since the combustion air and the fuel also contain moisture, the flue gas contains water vapor. The sulfur trioxide and water vapor in the flue gas react to produce sulfuric acid, which deposits upon the particulate matter. The sulfuric acid deposited upon the particulate matter imparts a degree of electrical conductivity to the particulate and promotes the electrostatic precipitation process.

If the fossil fuel contains too little sulfur, so that there is a deficiency of sulfur trioxide, and thence sulfuric acid in the flue gas, the electrostatic precipitator may not function properly because of the high electrical resistivity of the particulate. It is therefore known to add sulfur trioxide from an external source to the flue gas produced frown burning low-sulfur fossil fuels. See, for example, U.S. Pat. No. 3,993,429.

In the '429 sulfur trioxide conditioning system, sulfur is burned to form sulfur dioxide, which is passed over a catalyst to achieve further oxidation to sulfur trioxide. The sulfur trioxide is injected into the flue gas flow upstream of the electrostatic precipitator. The amount of injected sulfur trioxide is controlled by varying the amount of sulfur that is burned. Other similar sulfur trioxide systems, which have been successfully used commercially, include a system which starts with a sulfur dioxide feedstock, which is vaporized and then catalytically converted to sulfur trioxide.

Sulfur trioxide injection systems, such as illustrated in the '429 patent, work well and are widely used. In some instances, however, there are drawbacks: high equipment capital costs; a constant supply of sulfur or sulfur dioxide feedstock is required, and this feedstock must be safely handled; the several components of the burning, catalyzing, and injecting system must be kept in good working order; there is a substantial power consumption associated with the process; when the plant or system goes into stand-by condition, the system, at least from the converter forward, must be purged to prevent excessive corrosion of the system and/or blockage of the probe nozzles; the injection arrangement must be operative over a range of boiler operating conditions in a manner that appropriate mixing is achieved prior to the flue gas stream entering the precipitator; because the conversion of the newly produced $SO_2$ to $SO_3$ is not always 100% efficient, trace amounts of excess $SO_2$ may be produced; in many instances, significant runs of hot gas insulated duct-work must be included, together with complicated and costly manifold assemblies; and the like.

U.S. Pat. No. 5,011,516 describes an alternate approach to the types of systems illustrated in the '429 patent, and teaches an arrangement wherein a slip stream of flue gas is drawn from the main flow and passed over a catalyst. A portion of the sulfur dioxide in the slip stream is oxidized to sulfur trioxide, and the slip stream is merged back into the main flue gas flow. While of interest, this approach has major drawbacks when implemented, for example: system thermal efficiency is reduced because less heat is recovered; there is typically insufficient mixing of the slip stream with the main flow at the point where they rejoin, due to an insufficient pressure differential; and the like.

Moreover, the '516 patent does not disclose any approach which permits control of the amount of sulfur trioxide produced, responsive to variations in the sulfur content of the fuel and changes in other operating parameters. A patent to a related approach, U.S. Pat. No. 3,581,463, suggests using a fan to draw a portion of the hot gas flow into the slip stream, but gives no further details as to how the amount of sulfur trioxide can be controlled. One can imagine that valving could be added to the slip stream to control its total flow, but such valves are complex, expensive, and difficult to build.

U.S. Pat. No. 5,320,052, which is assigned to the same assignee as is this invention, provides an improvement over the approaches discussed above and includes a catalytic converter support adapted to be disposed across at least a portion of the cross-section of the main duct, and a catalyst for the oxidation of sulfur dioxide to sulfur trioxide is supported by the catalyst support. This system further includes a mechanical adjustment means for selectively adjusting the amount of surface area of the catalyst which is exposed to the flow of flue gas in the main duct. While it is believed that the '052 system is an advance over the prior art discussed hereinabove, several problems and/or deficiencies may exist, for example: structural modifications to the duct, which are required in a retrofit and/or new installed FGC system of this sort, is expensive and may be difficult to achieve in many instances; mechanical complexity, with a resultant potential for breakdown; the area required of the catalyst, and the supporting structure at the face is relatively substantial and the may result in a significant back pressure being created, which in turn may result in a decrease in power plant efficiency; depending upon the various adjustments of conversion required, the catalyst will have a tendency to uneven wear; and the like.

In addition to the above approaches, a currently pending patent application, which is assigned to the same assignee as is this invention, provides for s somewhat different approach. This application includes catalyst positioned within the main flue gas duct, and incorporates heating and/or cooling means for selectively varying the surface temperature of the catalyst, to take advantage of the phenomena that, within a predetermined temperature range, conversion efficiency of the catalyst will vary. While this arrangement has certain advantages of the mechanical systems discussed (i.e. less mechanical complexity, simpler retrofit, no moving parts, potential of decreased pressure loss, and the like), certain disadvantages are readily apparent (i.e. energy cost, capital expense, the cost of the surface temperature heating and cooling means, the replacement of components of a temperature responsive in-duct catalyst assembly may be more costly than replacing wear components of a mechanical system, and others).

There is therefore a need for an improved approach to sulfur trioxide conditioning of flue gas streams. The present invention fulfills this need, and further provides related advantages.

SUMMARY OF THE INVENTION

The present invention provides an apparatus and method for sulfur trioxide conditioning of flue gas streams produced by fossil fuel power plants. This approach permits a selectively controllable amount of sulfur trioxide to be created and added to the flue gas stream. The apparatus used to accomplish the sulfur trioxide addition is simple and rugged, and readily controlled to precisely vary the sulfur trioxide addition. There is no sulfur burning apparatus or supply of sulfur required. No slip stream is taken from the flue gas stream, and no associated variable-speed fan or valving is used to achieve controllability. No additional sulfur dioxide is added to the flue gas stream with the sulfur trioxide addition. There is no difficulty in mixing the sulfur trioxide into the flue gas stream. No overly cumbersome or difficult to maintain equipment is required. Back-pressure caused by the system of the present invention, is reduced from some prior systems heretofore. Only a relatively minor modification to the duct work is required for the present invention. The conversion efficiency of the catalyst is, under certain circumstances, increased. The uniformity of catalyst life in a given system may be increased. Capital and running costs may be relatively lower, and the range of conversion may be higher. Catalyst life may be longer.

In accordance with the invention, a sulfur trioxide conditioning system is provided for use in a fossil fuel-burning facility having a main duct for transporting sulfur dioxide-containing flue gas from a boiler, through a heat recovery apparatus, and to particulate removal equipment, such as an electrostatic precipitator, for subsequent discharge through a stack. The sulfur trioxide conditioning system includes catalytic converter means for converting a portion of the sulfur dioxide in the flue gas to sulfur trioxide. The catalytic converter system includes a support adapted to be disposed across at least a portion of the cross section of the main duct, and transversely spaced sections of catalyst carried by the support. The conditioning system further includes an adjustment assembly which is selectively operative to vary the quantity of flue gas flow passing through the catalyst sections. Varying the quantity of flue gas passing by the catalyst, will in turn vary the amount of sulfur trioxide produced by catalytic conversion.

The conditioning system of the present invention includes flue gas flow resistance sections carried by the support and disposed intermediate the catalyst sections. The purpose of these sections is assure that a selected amount of flue gas flow will in fact pass through the catalyst sections. To insure proper flow, the pressure loss coefficient, as to flue gas passing through the sections, is within a selected range.

The present invention provides an advance in the art of flue gas conditioning. Other features and advantages of the present invention will be apparent from the following more detailed description of the preferred embodiments, taken in conjunction with the accompanying drawings, which illustrate, by way of example, the principles of the invention.

DETAILED DESCRIPTION OF THE INVENTION

Figure 1:
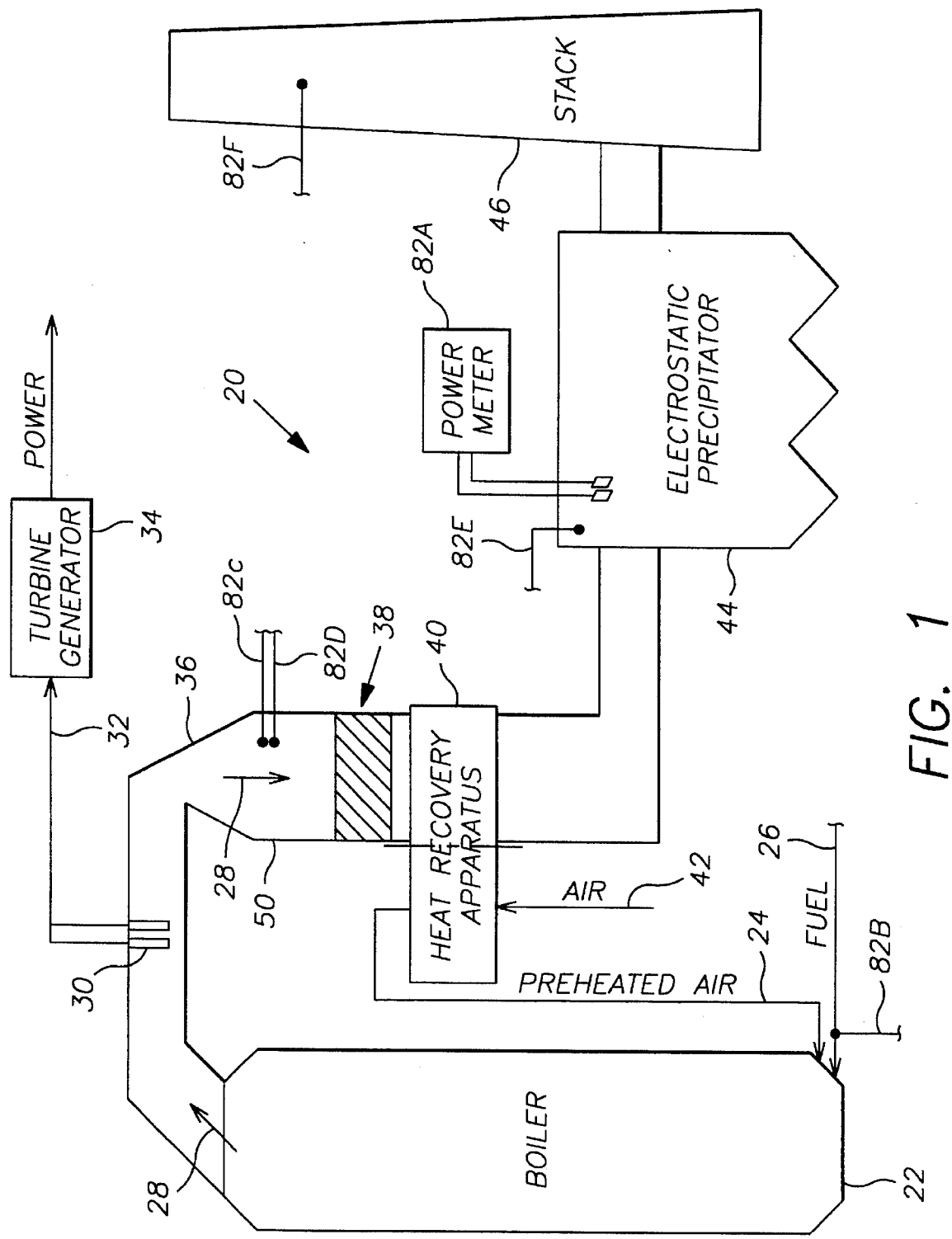
FIG. 1 is a schematic depiction of a fossil fuel power plant incorporating the principles of the present invention.

FIG. 1 schematically illustrates a fossil fuel power plant 20 utilizing the apparatus and method of the present invention therewithin. Briefly, the power plant 20 has a combustor/boiler 22, which is supplied preheated air through conduit 24, and fuel through fuel inlet 26. The fuel is combusted with the air, producing a flue gas flow 28. The flue gas flow 28 contains particulate matter (sometimes referred to as flyash), as well as other combustion products. The flue gas flow 28 heats water flowing in boiler tubes 30 and converts it to steam 32. The steam 32 is supplied to a turbine/generator 34 which produces electrical power.

Flue gas flows through the primary flue gas duct 36 and thence through a sulfur trioxide conditioning system 38 of the present invention. The flue gas flow 28 then passes through a heat recovery apparatus 40, wherein heat is transferred from the flue gas flow 28 to an incoming air flow 42 to provide preheated air flow through conduit 24. After leaving the heat recovery apparatus 40, the gas flow 28 enters an electrostatic precipitator 44, in which a large fraction of the particulate matter is removed by the application of electrostatic fields to the flue gas. The flue gas flows, with most particulate removed, through an exhaust stack 46.

This discussion of the power plant 20 is intended to be highly schematic in nature and to provide the information necessary to understand, practice, and enable the present invention. In an operating power plant there are typically many other systems, as well as alternative systems, that are not shown here. The present invention is compatible with such other systems and may be used with them.

The flue gas entering the electrostatic precipitator 44 must have enough sulfur trioxide to react with water vapor in the flue gas to produce a sufficient amount of sulfuric acid, which is deposited upon the surfaces of the particulate. The sulfuric acid imparts electrical conductivity to the particulate in the flue gas, which, as is well known, is necessary for proper and efficient use of electrostatic precipitators 44. Sufficient sulfur trioxide must be present to form the necessary sulfuric acid.

In the present invention, sulfur trioxide is produced in the sulfur trioxide system 38 of the present invention, by the catalytic oxidation of sulfur dioxide in the flue gas flow 28 to sulfur trioxide. Depending upon the catalyst used, as well as the flue gas temperature, the catalytic oxidation may be accomplished at a temperature above 400° F., and within a range of 400° to 1400° F. From present considerations, it is believed a minimum temperature of the flue gas flow 28, as it passes by system 38, may be 500° F., and in certain situations, no less than 650° F. The most appropriate temperature range, coupled with considerations of power plant efficiency and design, dictates that the primary portion of flue gas conditioning system 38 be positioned within duct 36, intermediate the discharge from boiler 32, and the heat recovery apparatus 40.

Figure 2:
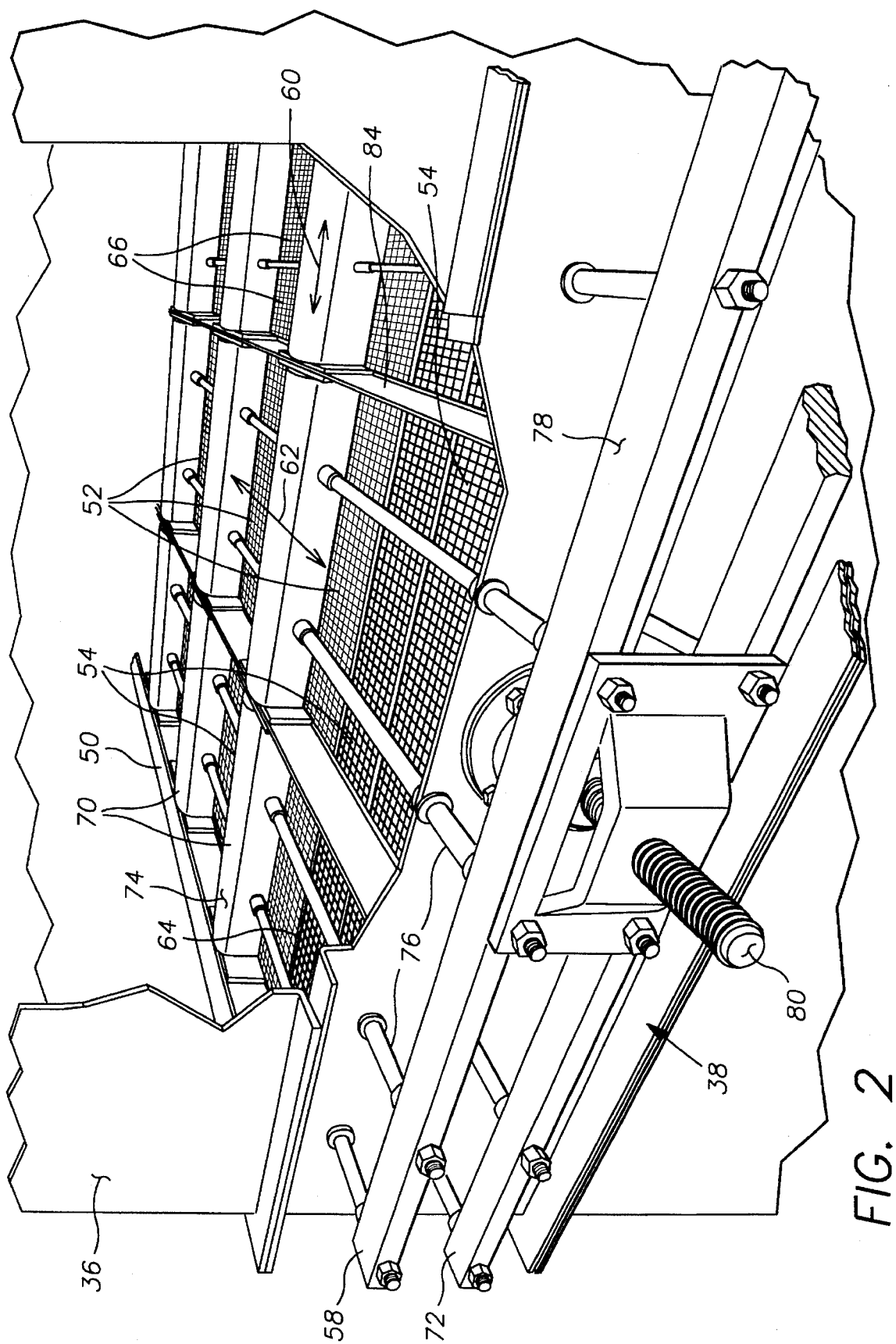
FIG. 2 is a perspective view of one embodiment of a sulfur trioxide assembly of the present invention, which is illustrated as being disposed within a flue gas duct of a fossil fuel power plant.

Referring now to FIG. 2, the sulfur trioxide conditioning system is illustrated as comprising: a system support 50, which is adapted to be suitably positioned in duct 36, for example by welding, bolting, or the like; a plurality of catalytic converter sections 52, which are elongated in a first transverse direction 60, with respect to the direction of the flue gas flow 28 therethrough, are carried by the system support 50, and are spaced with respect to each other, in a second transverse direction 62, with respect to the flue gas flow 28; elongated flow resistance sections 54 which are also carried by the system support 50, are elongated in the first transverse direction 60, are spaced from each other in the second transverse direction 62, and are positioned intermediate adjacent ones of said converter sections 52; and an adjustment assembly 58 which, as will be described hereinafter in detail, is selectively operable to vary the quantity of flue gas flow 28 through the catalytic converter sections 52, while simultaneously adjusting such flow through the resistance sections in an opposite direction. In other words, when, for example, the adjustments assembly 58 is operative to decrease the amount of flue gas flow through the catalytic converter sections 52, it will simultaneously cause the amount of flue gas flow through the resistance sections 54 to increase.

As illustrated, the sections 52 and 54 occupy substantially the entire transverse cross section of the open area of duct 36 and, as shown, are divided from each other by positioning and retaining walls 64, which are carried by the system support 38. Sections 52 are comprised of catalyzed portions 66 which are operative to promote a chemical reaction to convert a portion of the $SO_2$ in the flue gas stream to $SO_3$. Any suitable catalyst may be used for the oxidation of sulfur dioxide to sulfur trioxide (i.e. vanadium oxide, alkali metal pyrosulfates,and alkali metal oxides); however, for purposes of reducing the amount of catalyst required, and hence the potential back pressure and energy requirements, a precious metal catalyst is preferred. Any suitable configuration of catalyst may be used, for example a honey-comb configuration or, if preferred and conditions permit, a plate type catalyst, suitably configured in an undulated type arrangement, to define flow passages between adjacent plates, is acceptable.

The adjustment assembly 58 comprises: a plurality of shield assemblies 70 which are elongated in the first direction 60 and which are transversely spaced from each other in the second direction 62; and a movement assembly 72, which communicates with shield assemblies 70 for the selective movement thereof. Shield assemblies 70 are of any suitable configuration and, as illustrated, the respective upstream faces 74 thereof, present a rounded aerodynamically shaped configuration to the flue gas flow 28 to, among other advantages, assist in the flow distribution, decrease back pressure, and decrease wear, which latter advantage is particularly important to increase the longevity of the very expensive converter sections 52. It is to be noted at this point that any number of aerodynamic shapes can be substituted for the illustrated configuration of laces 74, by one skilled in the art.

Movement assembly 72 may be of any suitable construction and, as shown comprise: a plurality of rod members 76 which are elongated in the second transverse direction 62, are in sliding communication with the system support 50 and in rigid communication with the shield assemblies 70, and are transversely spaced with respect to each other in the first direction; a tie assembly 78 fixedly carried by the rod members adjacent one axial end thereof; and a worm gear 80 assembly carried by the system support 50, and in operative communication with the tie assembly 78. With an arrangement such as described, a suitable means of rotation, for example an electric or hydraulic motor, not shown, is suitably energized to impart a rotating force to turn the worm gear 80, which in turn causes the tie assembly 78 to move in the second transverse direction 62. Inasmuch as the rod members 76 are in rigid communication with the tie assembly 78, and the shield assemblies 70, the movement of the tie assembly 78 causes the shield assemblies 70 to move a corresponding amount. As illustrated, a plurality of slide and guideways 84 which are carried by system support 50 and extend longitudinally with respect to the second transverse direction 62, are transversely spaced from each other in the first transverse direction 60, and are included to provide a slide support and guideway for the transverse movement of the shield assemblies 70.

As illustrated, upstream and downstream rod members 74 are included. The reason for the upstream rod members is apparent from the drawings. As to the downstream rod members, the invention herein anticipates suitable aerodynamically configured shield assemblies (not shown) also being positioned at the downstream exit side of the sections 52 and 54, to assist in the transition of the flue gas flow 28 from such sections, and alleviate the potential for additional back pressure being created at the exit sides of sections 52 and 54. In this regard it is to be noted that the latter mentioned sections will underlay and be in registry with respect to the illustrated overlying sections 52 and 54, and will move in tandem therewith.

Shield assemblies 70 are dimensioned and operative to cover and uncover all or a portion of the upstream surface of the converter sections 52, in response to sliding forces imparted thereto by the selective operation of movement assembly 72. Thus as more of the shield assemblies 70 are uncovered, a greater quantity of flue gas flow 28 passes through the catalytic sections 52 (and less through the flow resistance sections 54) and, as such, the quantity of sulfur trioxide created is increased, and conversely when less of such upstream surface is covered. The preferred embodiment will have the transverse dimension, when viewed in the second direction 62, of the side of the shield assemblies 70 adjacent to the sections 52 & 54, generally equal to the transverse dimension, again when viewed in the second direction 62, of the of the sections 52. This arrangement will provide maximum balance, economics and efficient use of the catalyzed portions 52. Other matters to be considered with respect to the shield assemblies 70, include: the shield assemblies can caused to selectively move twice the transverse dimension thereof, when viewed in the second direction 52, thus incorporating an arrangement that selected sides of the catalyzed portions 66 can be alternately exposed to the flue gas flow 28 (hence resulting in potentially more uniform wear of the catalyzed portions); and, if desired, suitable soot blowing assemblies (not shown) can be positioned within the shield assemblies and be selectively energized to assist in the removal of accumulated particulate for the converter sections 52 and/or at least portions of the resistance sections 54.

The face area of the converter sections 52, with respect to the inside face area of the system support 50 will vary, dependent upon a number of matters (i.e. the temperature of the flue gas flow 28, the type of catalyst used, the velocity of the flue gas flow 28, the type of fuel being burned, the amount of sulfur trioxide to be generated, pressure loss coefficient considerations, and the like); however, it is anticipated that such first mentioned face area shall be within the range of 10% to 50% of the face area of such system support 50, and preferably less than 30% of the last mentioned face area. On related matters, it is anticipated that, in many instances, the transverse spacing between the converter sections 52 will be substantially equal, as will the transverse spacing between the resistance sections 54 (i.e. albeit in such situations it is not necessarily accurate that the transverse spacing between the converter sections 52 will equal the transverse spacing between the resistance sections 54). On the other hand, conditions (i.e. uneven flue gas flow 28, turbulence considerations and the like) may dictate that, rather than substantially equal spacing, a preselected spacing be selected based on mathematical, modeling and experience considerations.

An important consideration of the invention herein resides in a recognition that, to insure an efficient use of catalyst, and appropriate conversion efficiency for a given set of circumstances, comparative considerations of relative flow resistance of the pressure loss coefficients as to the flue gas flow 28 through the sections 52 & 54, respectively, must be made. In this regard, the Applicant has determined that the ratio of the pressure loss coefficient, as to the flue gas stream 28 passing through the resistance sections 54, with respect to the pressure loss coefficient, as to the flue gas stream passing through the converter sections 52, should be in the range of 0.2 to 2, and preferable 0.5 to 1.0. This coefficient can be established in any suitable manner, for example by dividing the static pressure drop by the dynamic or velocity head, all in a manner as is well known to one skilled in the art. These coefficient will be determined to some extent by the relative make up of the sections 52 and 54. In this regard, efficiency considerations will dictate relatively closer spacing of the honey comb channels or plate spacing of the catalyzed portions, when compared to the like spacing of the "fill" for the flow resistance sections 54 (Note: the flow resistance sections can be "filled" with any suitable configurations materials, for example grating or relatively large undulated plates.) It is to be noted that, because of the relative coefficients, changes in the relative exposure of specific face areas of sections 52 & 54 to the flue gas flow 28, does not necessarily create a straight line variation of the quantity of flow through such sections.

When considering the above discussion, as well as any number of operating parameters, certain additional preferred or practical criteria has been developed, for example: the range of desired conversion of sulfur dioxide to sulfur trioxide in the flue gas flow, should be in the range of substantially 0% to 20%, and often in the range of substantially 0% to 3%, in response to the selective operation of adjustment assembly 58; the sulfur trioxide conditioning system, when positioned within the duct 36, should result in an additional pressure loss of no more than 5 inches water gage, and, preferably, no more than 2 inches water gage.

The present invention is particularly suitable for direct automatic adjustment of assembly 58. In this regard a number of signals can feed back to a suitable microprocessor controller (not shown) to selectively control the degree of movement of the shield assemblies 70, in response to operational parameters. Examples of such signals can include, by way of example, but not limitation: sensor 82a, the power consumed by the electrostatic precipitator 44 (a measure of the amount of particulate being collected); sensor 82b, the boiler load; sensor 82c, the chemical composition of the flue gas, including the sulfur dioxide and sulfur trioxide contents, sensor 82d, the exhaust gas temperature; sensor 82e, the electrical properties of the fly ash particulate, such as its resistivity; and/or sensor 82f, the stack gas opacity. The construction of each of these sensors are individually well known in the art.

although a particular embodiment of the invention has been described in detail for purposes of illustration, various modifications may be made without departing from the spirit and scope of the invention; for example, one or more doors can be positioned in the system support 50 to assist in the removal and insertion of the catalyst; the configuration of shield assemblies can be modified to suit conditions: other forms of driving arrangements may be used for moving the shield assemblies 70; and the like. Accordingly, the invention is not to be limited, except as by the appended claims.

I claim:

1. A sulfur trioxide conditioning system for use in a fossil fuel-burning facility having a main duct for transporting sulfur dioxide containing flue gas from a boiler, through a heat recovery apparatus, and to particulate removal equipment for subsequent discharge through a stack, the sulfur trioxide conditioning system comprising:

a conditioning system support adapted to be disposed across at least a major portion of the transverse cross-section of the main duct;

transversely spaced sections of catalytic converter means carried by said support and operative in a manner to oxidize at least a portion of the sulfur dioxide in the flue gas passing thereby to sulfur trioxide, said sections creating a flow resistance with a first pressure loss coefficient as to flue gases passing therethrough;

transversely spaced sections of flue gas flow resistance means carried by said support, intermediate and adjacent said sections of flue gas converter means, said sections of flue gas resistance means creating a flow resistance with a second pressure loss coefficient as to flue gases passing therethrough;

adjustment means operative to selectively adjust the quantity of flue gas flow through said catalytic converter means, while simultaneously adjusting the quantity of flue gas flow through said resistance means, in a manner that when the quantity of flue gas flow through said converter means is reduced, the flow through said resistance means is increased and, conversely, when the flow through said converter means is increased, the flow through said resistance means is increased; and the ratio of the second pressure loss coefficient to the first pressure loss coefficient being in the range of 0.2 to 2.

2. A sulfur trioxide conditioning system as specified in claim 1 wherein said ratio is in the range of 0.5 to 1.0.

3. A sulfur trioxide conditioning system as specified in claim 1 wherein the system is adapted to be operatively positioned in the main duct, intermediate the boiler and the heat recovery apparatus.

4. A sulfur trioxide conditioning system as specified in claim 1 wherein said catalytic converter means is active in the conversion of sulfur dioxide to sulfur trioxide, at a temperature substantially no less than five hundred (500) °F.

5. A sulfur trioxide conditioning system as specified in claim 1 wherein said catalytic converter means is active in the conversion of sulfur dioxide to sulfur trioxide, at a temperature substantially no less than six hundred and fifty (650) °F.

6. A sulfur trioxide conditioning system as specified in claim 1 wherein the catalytically active portion of said catalytic converter means is of a precious metal catalyst.

7. A sulfur trioxide conditioning system as specified in claim 1 wherein said transverse spacing between said sections of catalytic converter means is uniform.

8. A sulfur trioxide conditioning system as specified in claim 7 wherein said transverse spacing between said sections of flow resistance means is uniform.

9. A sulfur trioxide conditioning system as specified in claim 1 wherein said transverse spacing between said sections of catalytic converter means is preselected.

10. A sulfur trioxide conditioning system as specified in claim 9 wherein said transverse spacing between said sections of flow resistance means is preselected.

11. A sulfur trioxide conditioning system as specified in claim 1 wherein said adjustment means is movable transversely of such flue gas flow.

12. A sulfur trioxide conditioning system as specified in claim 11 wherein said adjustment means is operative to selectively adjust the quantity of flue gas flow through said catalytic converter means, by selectively varying the face area of said sections of catalytic converter means, through which such flue gas flows.

13. A sulfur trioxide conditioning system as specified in claim 1 wherein said adjustment means incorporates a soot blowing assembly therewithin, which is selectively operative to assist in dislodging accumulated particulate from said catalytic converter means.

14. A sulfur trioxide conditioning system as specified in claim 13 wherein said soot blowing assembly is selectively operative to assist in dislodging accumulated particulate from said flow resistance means.

15. A sulfur trioxide conditioning system as specified in claim 11 wherein an area of 10% to 50% of said system support (as measured transversely to the flue gas flow) contains said sections of catalytic converter means therewithin, and the balance of such area contains said sections of flow resistance means therewithin.

16. A sulfur trioxide conditioning system as specified in claim 15 wherein said adjustment means is configured and operative to selectively expose and cover, with respect to the flue gas flowing through such conditioning system, up to and including 100% of said sections of catalytic converter means.

17. A sulfur trioxide conditioning system as specified in claim 16 wherein said adjustment means includes a plurality of transversely spaced elongated shield assemblies, upstream of said sections, with: the transverse spacing of said shield assemblies being substantially equal to the transverse spacing of said sections of catalytic converter means; the axial elongation of said shield assemblies being substantially identical to the extent of the elongation of said sections of catalytic converter means; and the width of said shield assemblies being substantially identical to the width of said sections of catalytic converter means.

18. A sulfur trioxide conditioning system as specified in claim 17 wherein said shield assembly includes an upstream deflector section, which is aerodynamically configured with respect to the flue gas stream passing thereby.

19. A sulfur trioxide system as specified in claim 18 additionally including downstream exit deflectors, in spaced registry, with respect to the direction of flow of such flue gas stream, from said first upstream deflector sections, said exit deflector sections being aerodynamically configured with respect to the flue gas stream passing thereby.

20. A sulfur trioxide assembly as specified in claim 19 wherein said shield assembly is operative in a manner that said upstream and exit deflector sections are selectively movable, in tandem, transversely with respect to the direction of the flue stream passing thereby.

21. A sulfur trioxide conditioning system as specified in claim 11 wherein said adjustment means includes upstream deflector sections, which are aerodynamically configured with respect to the flue gas stream passing thereby.

22. A sulfur trioxide system as specified in claim 18 additionally including downstream exit deflectors, in spaced registry, with respect to the direction of flow of such flue gas stream, from said first upstream deflector sections, said exit deflector sections being aerodynamically configured with respect to the flue gas stream passing thereby.

23. A sulfur trioxide assembly as specified in claim 22 wherein said adjustment means is operative in a manner that said upstream and exit deflector sections are selectively movable, in tandem, transversely with respect to the direction of the flue stream passing thereby.

24. A sulfur trioxide conditioning system as specified in claim 16 wherein said adjustment means is operative to selectively expose and cover both sides, with respect to the direction of movement of said adjustment means, of said sections of catalytic converter means.

25. A sulfur trioxide conditioning system as specified in claim 1 wherein the percentage of sulfur dioxide in the flue gas passing by such system, which is converted to sulfur trioxide, is in the range or 0% to 20%, in response to the operation of such adjustment means.

26. A sulfur trioxide conditioning system as specified in claim 1 wherein the percentage of sulfur dioxide in the flue gas passing by such system, which is converted to sulfur dioxide, is in the range or 0% to 3%, in response to the operation of such adjustment means.

27. A sulfur trioxide conditioning system as specified in claim 1 wherein said catalytic converter means comprises a plurality of catalyzed plates configured in a manner to define flue gas flow paths therebetween, with said plates being positioned so that flue gas flow may pass through said flow paths.

28. A sulfur trioxide conditioning system as specified in claim 1 wherein said catalytic converter means comprises a plurality of longitudinally extending, transversely spaced honey-combed members, with said honey-comb members being positioned so that the flue gas flows longitudinally therethrough.

29. A sulfur trioxide conditioning system as specified in claim 1 which, when positioned within such a duct, results in an additional pressure drop of less than 5 inches water gage.

30. A sulfur trioxide conditioning system as specified in claim 1 which, when positioned within such a duct, results in an additional pressure drop of less than 2 inches water gage.

31. A method for treating the flue gas emitted from a coal burning boiler, prior to flue gas passing to an electrostatic precipitator, comprising the steps of:

passing such flue gas through a primary duct extending between the exit of the boiler and the entrance to the precipitator;

catalytically converting a portion of the sulfur dioxide contained within such flue gas to sulfur trioxide, by passing at portion of such flue gas stream over a catalyst which is positioned within a portion of such duct;

selectively varying the amount of sulfur trioxide produced by said catalytically converting, by selectively changing the quantity of flue gas flowing through such catalyst; and simultaneously maintaining the ratio of the pressure loss coefficient of the flue gas flowing through the other portion of such duct, in the vicinity of such catalyst, to the pressure loss coefficient of the flue gas flowing through said catalyst, in the range of from 0.2 to 2.

32. A method as specified in claim 31 wherein said range is from 0.5 to 1.0.

33. A method as specified in claim 31 wherein said selectively varying is by varying the face area of the catalyst through which such flue gas flows.

* * * * *